US008933950B2

(12) United States Patent
Takahashi et al.

(10) Patent No.: US 8,933,950 B2
(45) Date of Patent: Jan. 13, 2015

(54) IMAGE PROCESSING DEVICE

(75) Inventors: Masaki Takahashi, Kanagawa (JP);
Yoshinobu Matono, Saitama (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 188 days.

(21) Appl. No.: 13/554,153

(22) Filed: Jul. 20, 2012

(65) Prior Publication Data
US 2013/0033512 A1 Feb. 7, 2013

(30) Foreign Application Priority Data
Aug. 5, 2011 (JP) ................................. 2011-172292

(51) Int. Cl.
*G09G 5/36* (2006.01)
(52) U.S. Cl.
CPC ...................................... *G09G 5/36* (2013.01)
USPC ......................................... 345/544; 345/546
(58) Field of Classification Search
USPC ............................................... 345/545, 556
See application file for complete search history.

(56) References Cited

U.S. PATENT DOCUMENTS

| | | | |
|---|---|---|---|
| 6,462,744 B1 * | 10/2002 | Mochida et al. | 345/543 |
| 6,954,419 B1 * | 10/2005 | Kimura et al. | 369/275.3 |
| 2005/0111829 A1 * | 5/2005 | Ito et al. | 386/69 |
| 2009/0295977 A1 * | 12/2009 | Sato | 348/333.12 |
| 2010/0040299 A1 * | 2/2010 | Noh et al. | 382/233 |
| 2010/0215347 A1 * | 8/2010 | Ikeda et al. | 386/108 |

FOREIGN PATENT DOCUMENTS

| | | |
|---|---|---|
| JP | 2005027337 A | 1/2005 |
| JP | 2008270937 A | 11/2008 |

OTHER PUBLICATIONS

Office Action issued for corresponding Japanese Patent Application No. 2011-172292, dated Jul. 9, 2013.

* cited by examiner

*Primary Examiner* — Mark Zimmerman
*Assistant Examiner* — Yu-Jang Tswei
(74) *Attorney, Agent, or Firm* — Matthew B. Dernier, Esq.; Gibson & Dernier LLP

(57) ABSTRACT

When a display target determination unit determines image data to be displayed, a reproduction control unit identifies the type of the image data to be displayed. The reproduction control unit divides the region of a display buffer according to the identified type. While an image display control unit displays an image, on a display device, by using image data stored in a spare buffer, a decoding execution unit decodes said image data and stores the decoded image data in a divided region of the display buffer.

8 Claims, 10 Drawing Sheets

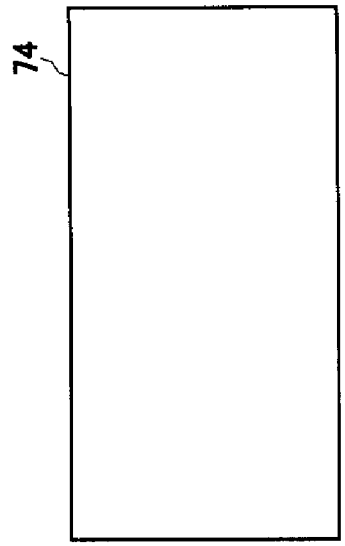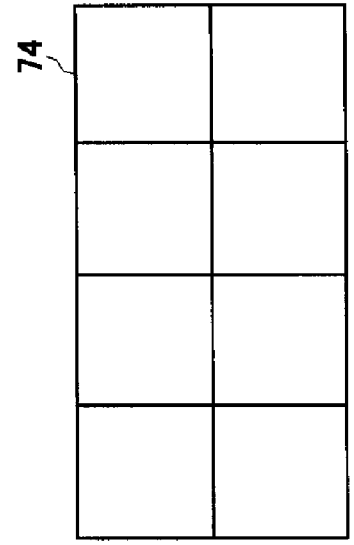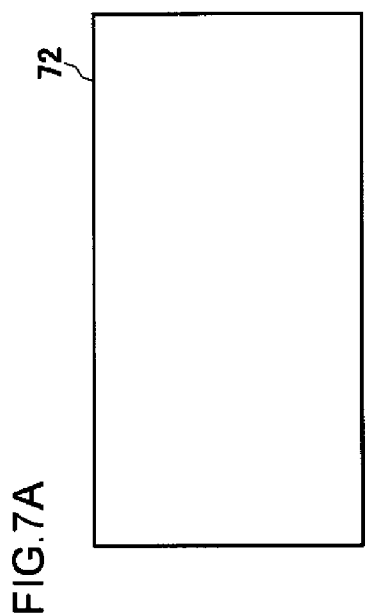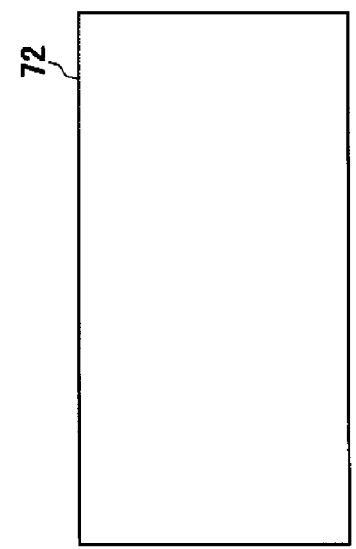
FIG.7A
FIG.7B

12

210

12

IMAGE PROCESSING DEVICE

BACKGROUND OF THE INVENTION

1. Field of the Invention

The present invention relates to an image processing technology.

2. Description of the Related Art

There are viewers for interchangeably displaying, one after another, a plurality of photograph images stored in a memory device, such as a hard disk drive, according to a switching instruction from a user for changing a display image. In order to avoid a situation where an image process such as a decoding process can no longer catch up with image display, technologies have been suggested for prefetching and processing image data in an order set according to the degree of probability of being displayed.

[Patent Document No. 1] US Patent Application Publication No. 2009/0295977

With an increase in the performance and capabilities of digital cameras, a format is defined for summarizing and recoding a plurality of image data items that are interrelated. A standard formulated by the Camera & Imaging Products Association defines a data structure for recording a plurality of image data items and defines a format called "Multi-Picture Format" in which this data structure is used.

In the Multi-Picture Format, a "multi-view" is defined as an image type. The multi-view is subdivided into three types: panorama; disparity(stereoscopic); and multi-angle, and each subdivided type specifies a display format in a viewer. The image types are determined by setting an image-capturing mode by a user at the time of image capturing with a digital camera. A plurality of image data items that have been captured are put together as a single image file containing an image-type code by an internal circuit of the digital camera. With the generation of various types of photograph images by digital cameras, it is requested that viewers are provided with functions for suitably reproducing image data.

SUMMARY OF THE INVENTION

Accordingly, a purpose of the present invention is to provide a technology for suitably processing image data according to an image type.

An image processing device according to one embodiment of the present invention comprises: a reproduction processing unit configured to decode image data; a display buffer configured to store the decoded image data; and an image display control unit configured to display the image data stored in the display buffer, wherein the reproduction processing unit divides the region of the display buffer according to the type of the image data to be displayed and stores the decoded image data in at least one of divided regions.

Optional combinations of the aforementioned constituting elements and implementations of the invention in the form of methods, apparatuses, systems, recording mediums, and computer programs may also be practiced as additional modes of the present invention.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

FIG. 7A is a diagram illustrating the configuration of a buffer memory; and FIG. 7B is a diagram illustrating an example of a usage state of the buffer memory;

DETAILED DESCRIPTION OF THE INVENTION

The invention will now be described by reference to the preferred embodiments. This does not intend to limit the scope of the present invention, but to exemplify the invention.

Figure 1:
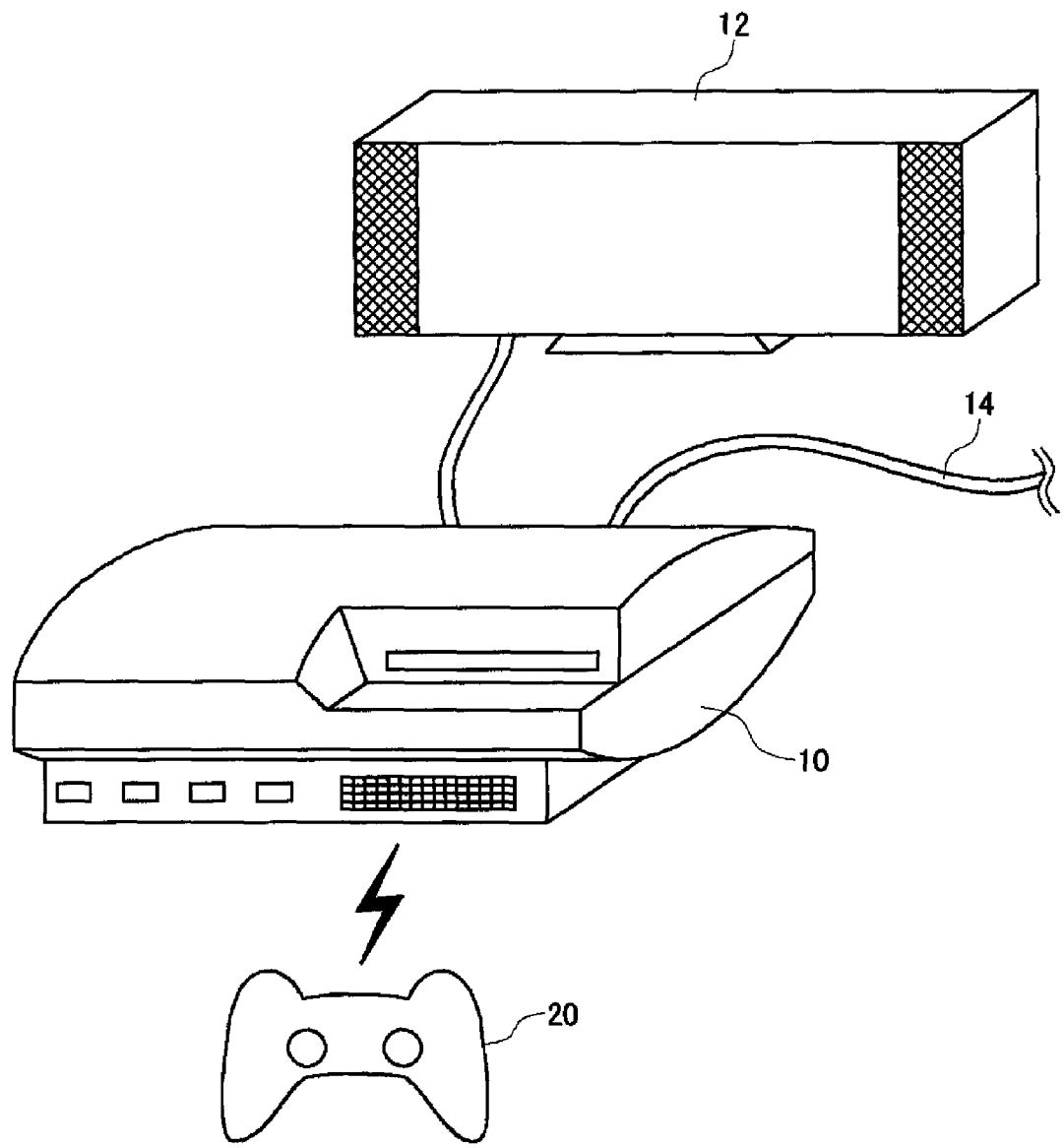
FIG. 1 is a diagram illustrating an environment in which an image processing system according to the embodiment of the present invention is used.

FIG. 1 illustrates an environment in which an image processing system 1 according to an embodiment of the present invention is used. The image processing system 1 comprises: an input device 20 to be operated by a user; an image processing device 10 for running image processing software; and a display device 12 for outputting a result of processing performed by the image processing device 10. The display device 12 may be a TV having a display for outputting an image and a speaker for outputting a sound or may be a computer display. The display device 12 may be connected to the image processing device 10 via a wired cable or wirelessly via a wireless LAN (Local Area Network). The image processing device 10, the input device 20, and the display device 12 may be formed integrally such that the devices are configured as a portable terminal device provided with an image processing function.

In the image processing system 1, the image processing device 10 is connected to an external device such as a personal computer via a cable 14 and can acquire image data from the external device. The image processing device 10 has a USB (Universal Serial Bus) terminal. Being connected to a digital camera via the USB cable, the image processing device 10 can acquire image data from the digital camera. The image processing device 10 has a media drive and may acquire image data from ROM media or may acquire image data from an external server or the like via a network.

The image processing device 10 may be, e.g., a game device, and an image processing function is achieved by loading an application program for image processing. The image processing device 10 may be a personal computer, and an image processing function may be achieved by loading an application program for image processing.

Figure 2:
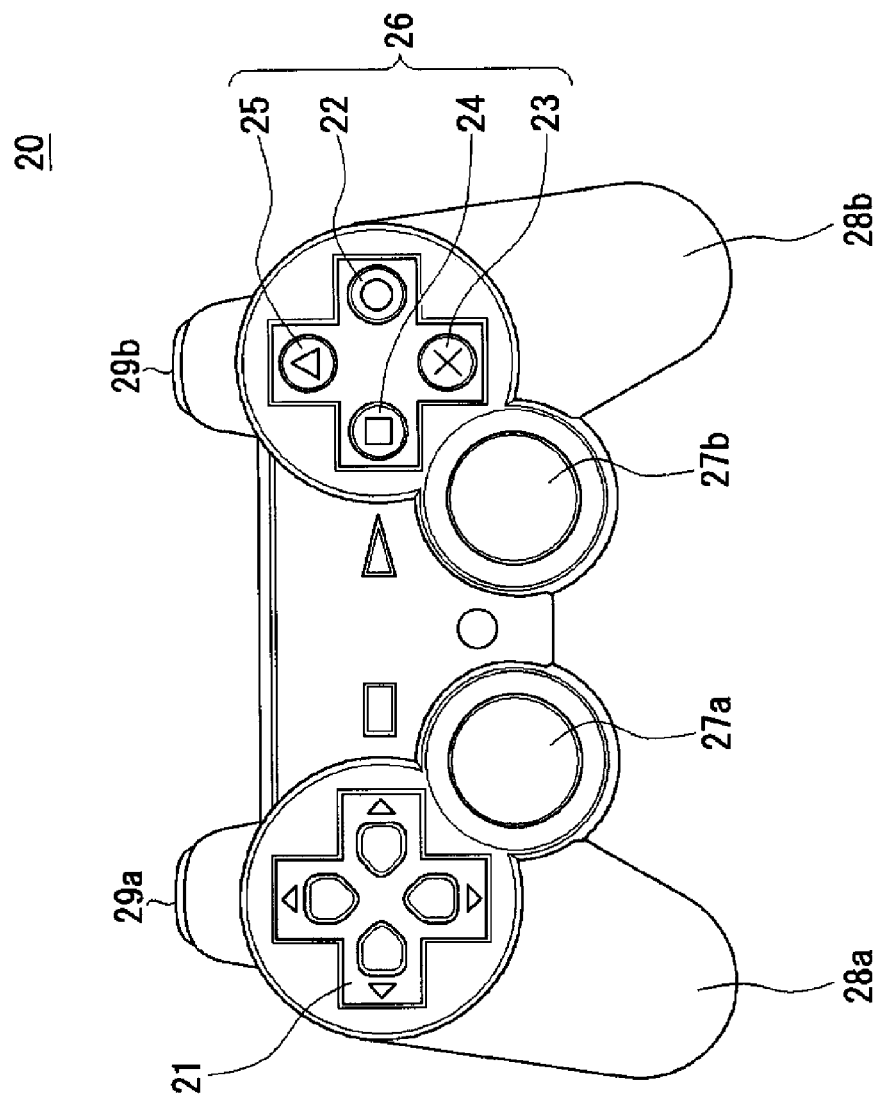
FIG. 2 is a diagram illustrating the exterior configuration of an input device.

FIG. 2 illustrates the exterior configuration of the input device 20. The input device 20 is provided, on the surface of a housing thereof, with directional keys 21, analog sticks 27a and 27b, and four types of operation buttons 26 as operation means operable by the user. The four types of operation buttons 26 comprise a circle-marked button 22, an x-marked button 23, a square-marked button 24, and a triangle-marked button 25. On the rear housing surface of the input device 20, an L1 button 29a and an R1 button 29b are provided on the left side and the right side, respectively. The user holds a left grip 28a with his/her left hand and a right grip 28b with his/her right hand so as to operate each operation means.

The input device 20 has a function of transmitting an operation signal entered by the user to the image processing device 10. In the embodiment, the input device 20 is configured to be capable of communicating wirelessly with the image processing device 10. The input device 20 and the image processing device 10 may establish a wireless connection using Bluetooth (registered trademark) protocol or IEEE 802.11 protocol. The input device 20 may be connected to the image processing device 10 via a cable so as to transmit an operation signal entered by the user to the image processing device 10.

Figure 3:
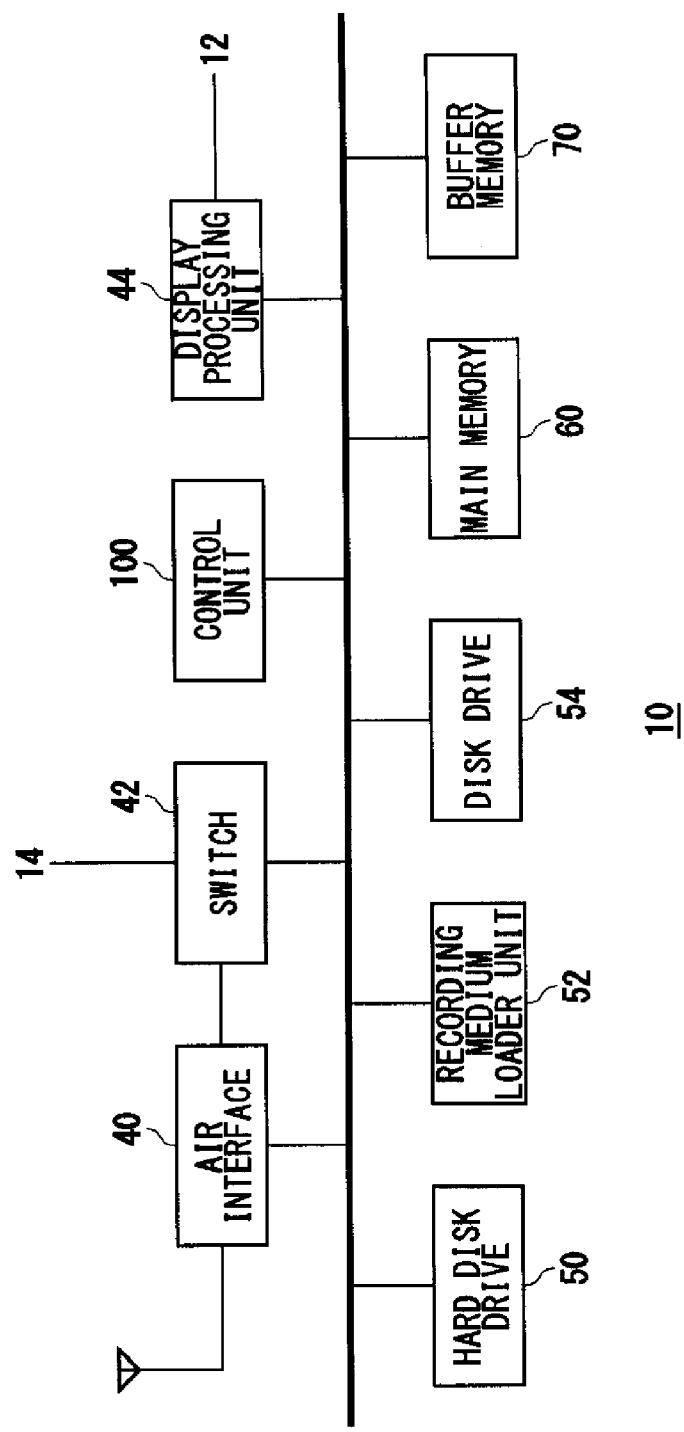
FIG. 3 is a diagram illustrating functional blocks of an image processing device.

FIG. 3 is a functional block diagram of the image processing device 10. The image processing device 10 comprises an air interface 40, a switch 42, a display processing unit 44, a hard disk drive 50, a recording medium loader unit 52, a disk drive 54, a main memory 60, a buffer memory 70, and a control unit 100. The display processing unit 44 has a frame memory for buffering data to be displayed on a display of the display device 12.

The switch 42 is an Ethernet switch (Ethernet is a registered trademark) and a device that is connected to an external device by wire or wirelessly so as to transmit and receive data. The switch 42 is connected to the air interface 40, and the air interface 40 is connected to the input device 20 through a predetermined wireless communication protocol. The operation signal entered by the user in the input device 20 is provided to the control unit 100 via the air interface 40 and the switch 42.

The switch 42 is connected to an external device via the cable 14 and acquires a plurality of image files from the external device. The plurality of image files may be image files (hereinafter, also referred to as "MP file(s)") defined by the Multi-Picture Format (hereinafter, referred to as "MP format"). The image files include those that link a plurality of image data items. A "multi-view" image type is defined for MP files linking a plurality of image data items. The plurality of image data items may be linked by describing, as a separate file, information regarding the linking of plurality of image data items. Alternatively, file names may be created for respective individual image data items according to a predetermined rule and then stored in one folder so as to link the plurality of image data items. As described, a plurality of image data items may be linked by various methods. As an example, an explanation is given in the following regarding a case where linking is performed using an MP file.

The hard disk drive 50 functions as an auxiliary memory device for storing data. An MP file received via the switch 42 is stored in the hard disk drive 50. The MP file stored in the hard disk drive 50 is decoded and stored in the buffer memory 70 at the time of display processing.

When a removable recoding medium such as a memory card is loaded, the recording medium loader unit 52 reads out data from the removable recoding medium. When a read-only ROM disk is loaded, the disk drive 54 drives and recognizes the ROM disk so as to read data. The ROM disk may be an optical disk or a magneto-optical disk. The MP file may be stored in a removable recording medium or a ROM disk and installed on the hard disk drive 50 from the recording medium loader unit 52 or the disk drive 54. Alternatively, the MP file may be decoded and stored in the buffer memory 70 at the time the display processing is performed.

The control unit 100 is provided with a multi-core CPU and has one versatile processor core and a plurality of simple processor cores in one CPU. The versatile processor core is referred to as a PPU (Power Processing Unit), and the remaining processor cores are referred to as a SPU (Synergistic-Processing Unit).

The control unit 100 is provided with a main controller that connects to the main memory 60 and the buffer memory 70. The PPU has a register and is provided with a main processor as a main body for executing the calculation so as to efficiently assign a task serving as a basic processing unit in the application to execute to each SPU. The PPU itself may execute the task. The SPU has a register and is provided with a sub-processor serving as a main body for executing the calculation and local memory serving as a local storage region. The local memory may be used as the buffer memory 70. The main memory 60 and the buffer memory 70 are configured as RAM (Random Access Memory). The SPU has a dedicated DMA (Direct Memory Access) controller as a control unit and performs data transfer between the main memory 60 and the buffer memory 70 at high speed so that high speed data transfer can be realized between the frame memory in the display processing unit 44 and the buffer memory 70. The control unit 100 according to the present embodiment realizes a high speed image processing function by allowing a plurality of SPU's to operate in parallel. The display processing unit 44 is connected to the display device 12 and outputs a result of image processing in accordance with user request.

Figure 4:
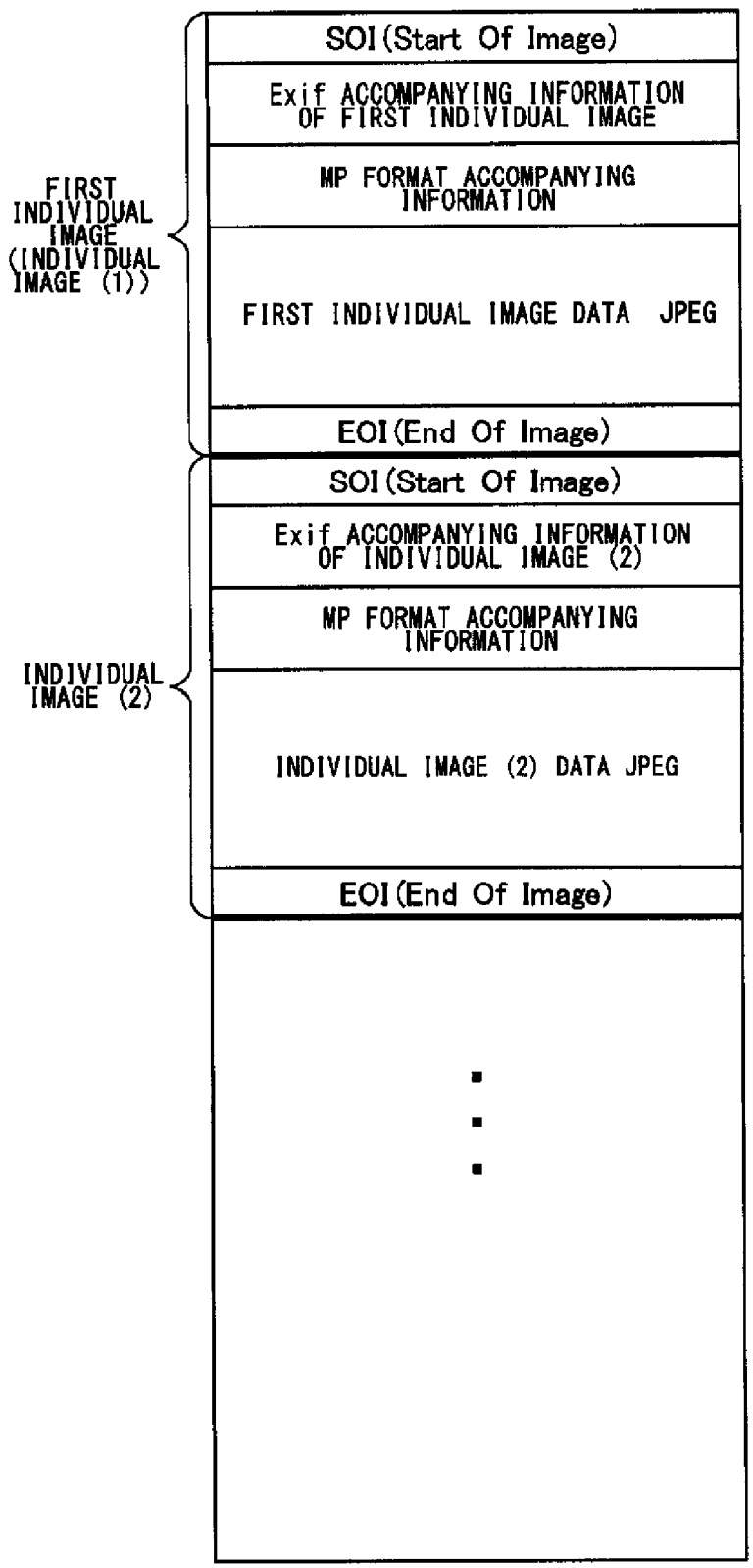
FIG. 4 is a diagram illustrating the basic structure of an MP format.

FIG. 4 illustrates the basic structure of an MP format. This MP format shows a structure where a plurality of image data items are linked. An MP file is capable of recording a single or a plurality of individual images following a first individual image. FIG. 4 shows only one individual image (2) that follows the first individual image (individual image (1)). However, a plurality of individual images may be recorded following the first individual image. The first individual image and a subsequent individual image have, in principle, Exif accompanying information and MP format accompanying information.

(Exif Accompanying Information)

An Exif (Exchangeable Image File Format) is a format used for recording image files and allows various accompanying information obtained at the time of image capturing to be included in an image file with the image data. The Exif accompanying information include: information related to image capturing such as an image-capturing date and time, a camera model name, shutter speed, an aperture value setting; and information such as a compression mode, a color space, and a pixel number for correctly reading captured image data. The Exif accompanying information also includes a thumbnail image of a captured image.

(MP Format Accompanying Information)

MP format accompanying information of a first individual image includes an MP header, an MP index, and MP individual information. The MP header records an offset to the MP index.

The MP format accompanying information of an individual image other than the first individual image includes an MP header and MP individual information. The MP header records an offset to the MP individual information.

(1) MP Index

An MP index is included only in a first individual image. The MP index comprises at least the following index information.

a) The Number of Recorded Images

The number of recorded images specifies the number of individual images included in an MP file. In the present embodiment, up to 15 individual images are included in a "multi-angle" image file, and two individual images, one for a left eye and one for a right eye, are included in a "disparity (stereoscopic)" image file.

b) MP Entry

An MP entry specifies a data group composed of individual image type management information, an individual image size, an individual image data offset, and a dependent image entry number. Of these, the individual image type management information comprises at least the following management information.

b-1) Representative Image Flag

If an individual image is a representative image, a representative image flag is set to 1. If the individual image is not a representative image, the representative image flag is set to 0. The number of individual images in an MP file with the representative image flag set to 1 cannot be 2 or greater. The representative image represents all the individual images in the MP file.

b-2) Type Code

A type code specifies the MP type of an individual image. In the MP format, a multi-view image captured from a plurality of different viewpoints is defined. As subdivided types (types) of a multi-view individual image, "panorama," "disparity," and "multi-angle" are defined. A type code is set for each of these types: "panorama"; "disparity"; and "multi-angle." During image capturing, an MP type is determined by the user's selection of an image-capturing mode, and a type code is added as index information.

(2) MP Individual Information

MP individual information includes information according to an image-capturing mode. If the image capturing is performed in the "panorama" mode, the MP individual information includes arrangement information used to create a single panorama image using a plurality of individual images and information regarding an amount of overlap between two successive images to be overlapped with each other. If the image capturing is performed in the "disparity" mode, the MP individual information includes information regarding a convergence angle with respect to a reference viewpoint and information regarding a baseline length with respect to the reference viewpoint. If the image capturing is performed in the "multi-angle" mode, the MP individual information includes information regarding a distance along a horizontal axis, a distance along a vertical axis, a distance along a collimation axis, the amount of vertical axis rotation in degrees of an angle (yaw angle), the amount of horizontal axis rotation in degrees of an angle (pitch angle), and the amount of collimation axis rotation in degrees of an angle (roll angle).

An explanation is given on a reproduction process of an image file in the following.

Figure 5:
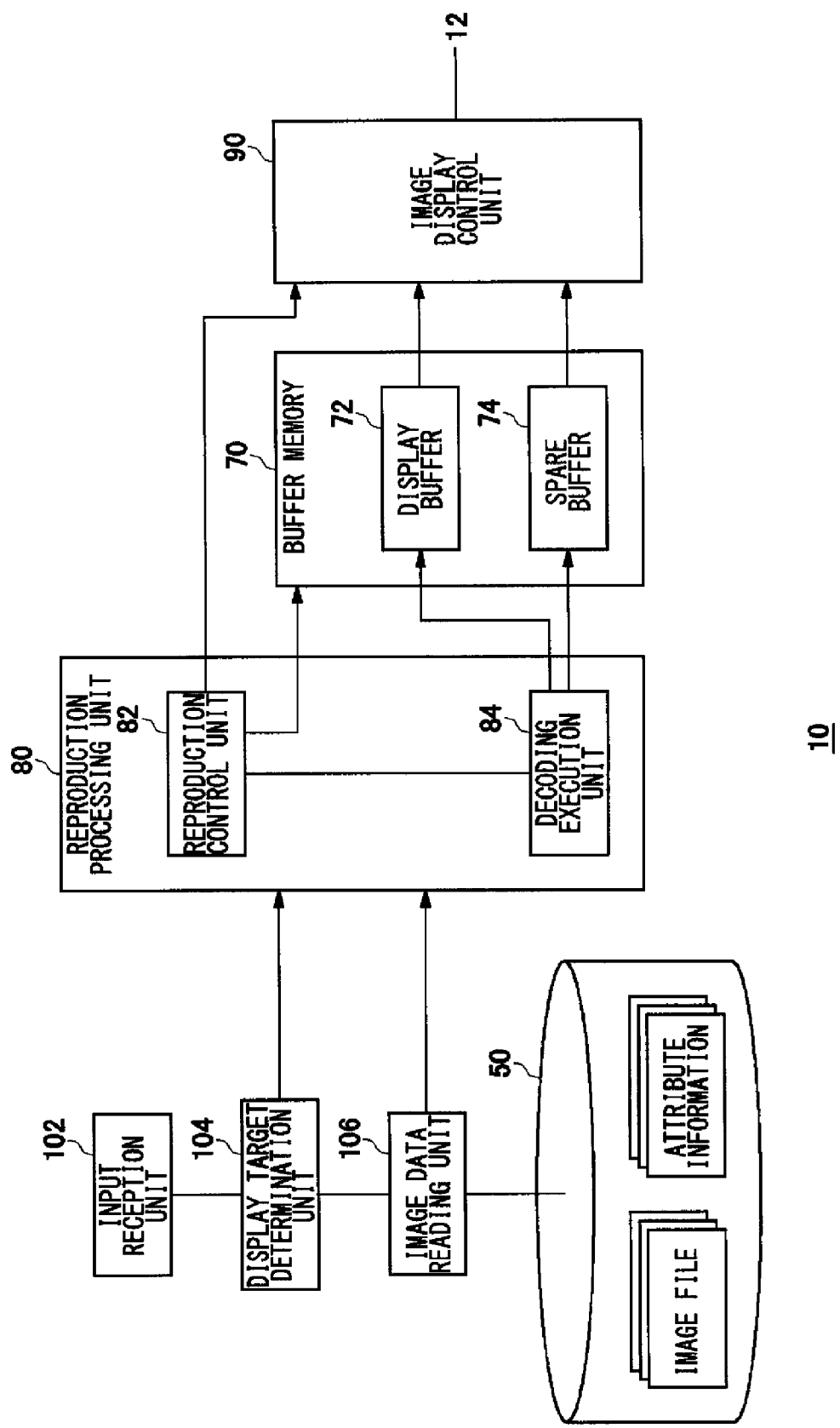
FIG. 5 is a diagram illustrating functional blocks related to a reproduction process of a control unit and a display processing unit.

FIG. 5 illustrates functional blocks related to a reproduction process of a control unit 100 and a display processing unit 44. An image processing device 10 comprises an input reception unit 102, a display target determination unit 104, an image data reading unit 106, a reproduction processing unit 80, a buffer memory 70, an image display control unit 90, and a hard disk drive 50. The reproduction processing unit 80 has a reproduction control unit 82 and a decoding execution unit 84, and the buffer memory 70 has a display buffer 72 and a spare buffer 74. A reproduction processing function in the image processing device 10 is realized by an image processing application (hereinafter, referred to as "image viewer") installed in the image processing device 10.

In FIG. 5, the elements shown in functional blocks that indicate a variety of processes are implemented in hardware by any CPU (Central Processing Unit), memory, or other LSI's, and in software by a program loaded in memory, etc. As stated previously, the control unit 100 is provided with one PPU and a plurality of SPU's, and functional blocks can be formed by a PPU only, a SPU only, or the cooperation of both. Therefore, it will be obvious to those skilled in the art that the functional blocks may be implemented in a variety of manners by a combination of hardware and software.

The hard disk drive 50 is a storage device for storing a plurality of image data items that are linked. An image viewer according to the present embodiment can reproduce a photograph image recorded in an external recording medium as well as a photograph image stored in the hard disk drive 50. The image viewer has a function of reproducing an MP file in which a plurality of image data items are linked. The image viewer obviously has a function of reproducing the data of a single image that is compressed in a normal format such as a JPEG or GIF. An explanation is given in the following regarding a situation when the image viewer reproduces image data stored in the hard disk drive 50. An MP file and a file compressed in a JPEG or GIF are sometimes collectively referred to simply as image files, hereinafter.

In the image processing device 10, system software performs file check in reference to accompanying information included in an image file when installing the image file in the hard disk drive 50. If the image file is normal, the system software extracts the accompanying information such as a file format, etc., and stores the extracted accompanying information in the hard disk drive 50. The system software may reduce the image data so as to generate a thumbnail image at the time of the installation.

For example, if the image file is an MP file, the system software extracts at least a part of the accompanying information and stores the extracted accompanying information as attribute information in the hard disk drive 50. The accompanying information to be extracted includes data to be displayed on a menu screen such as a thumbnail image, etc. The system software identifies the display format of the MP file based on the accompanying information of the MP file and stores the display format as attribute information in the hard disk drive 50. As explained regarding FIG. 4, the MP index includes a type code specifying the MP type of an individual image. In reference to the type code, the system software identifies the display format of the MP file. For example, if the type code specifies the "multi-angle" image type, the system software identifies the display format of the MP file as multi-angle, and if the type code specifies the "disparity" image type, the system software identifies the display format of the MP file as disparity. In a reproduction mode, images captured from a plurality of directions are interchangeably displayed according to a display switching instruction from the user in the "multi-angle" display format, and an image for a right eye and an image for a left eye are displayed in the "disparity" display format. As described, the system software identifies the display format of the MP file according to the type code recorded in the MP file. As described above, a type code and a display format may be put into one-to-one correspondence. However, for example, if an image file with a "disparity" type code contains three or more images therein, the system software may identify the display format of the image file as "multi-angle." Hereinafter, a term "the type of image data" is used to refer to a display format.

Figure 6:
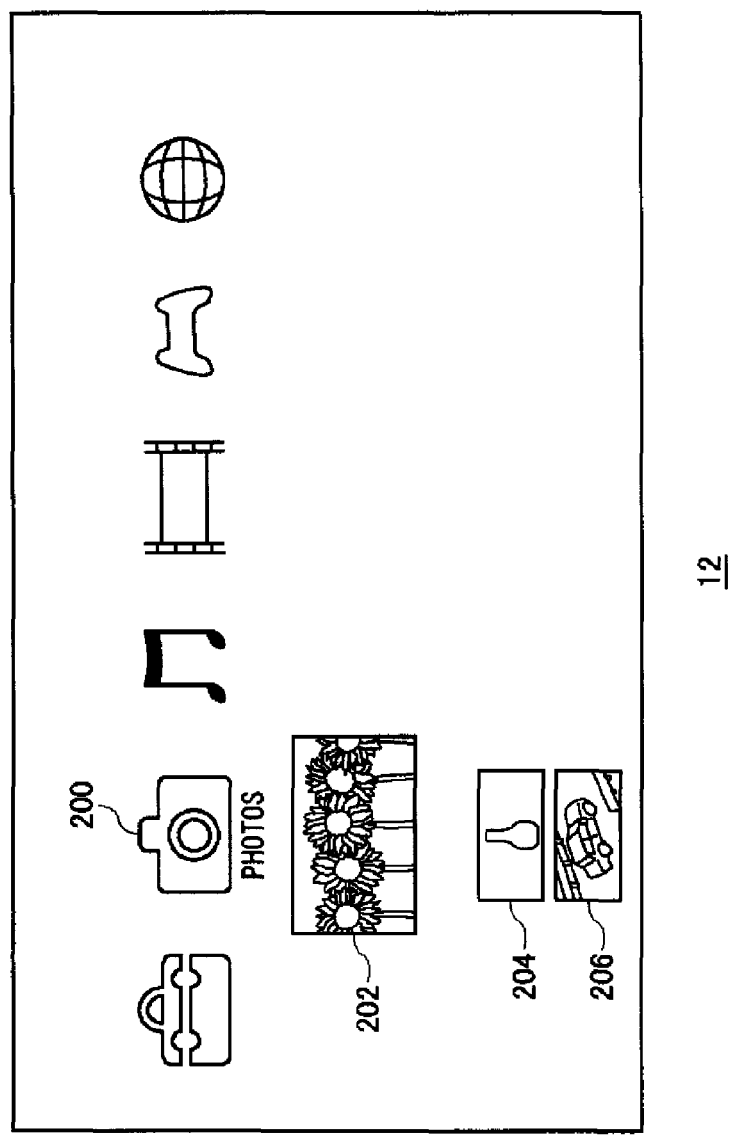
FIG. 6 is a diagram illustrating an example of a menu screen displayed on a display device.

FIG. 6 illustrates an example of a menu screen displayed on the display device 12. In the image processing device 10 according to the present embodiment, the system software generates a menu screen. Of a plurality of folder images arranged in a horizontal direction, a folder image 200 shows a folder for photograph content. In a vertical direction, icon images 202, 204, and 206 are arranged. By operating the input device 20 to move a desired icon image to a position of a focus region by scrolling, and then by pressing a predetermined button of the input device 20, the user allows a process associated with the icon image to be performed. In the example in FIG. 6, the icon image 202 of the photograph content is arranged in the focus region, and upon the pressing of the circle-marked button 22 of the input device 20 by the user, a reproduction instruction is generated, and the image viewer is started. The menu screen shown in FIG. 6 does not shown an icon image of a recording medium that has recorded image data. The icon image of the recording medium may be displayed immediately below a photo icon, and the icon images 202, 204, and 206 may be arranged below or to the right of the medium icon image.

If a thumbnail image is included in an image file, the system software generates an icon image using the thumbnail image. If a thumbnail image is not contained in the image file, the system software reduces the image data so as to generate an icon image. For an MP file, the system software reads out attribute information from the hard disk drive 50, identifies a thumbnail image of an individual image for which a representative image flag is set to 1, and generates an icon image.

Upon the pressing of a predetermined button of the input device 20 by the user while having the menu screen shown in FIG. 6, an image file reproduction instruction is generated, and the image viewer is started. With this, a reproduction process of an image file specified by the icon image 202 arranged in the focus region is started.

In the present embodiment, a display order by the image viewer is set in advance for a plurality of image files stored in the hard disk drive 50. The display order may be an order in which the image files are stored in the hard disk drive 50 or may be an order obtained in accordance with the generation date and time (image-capturing date and time) of the image files. When the image viewer is started such that an image is displayed on the display device 12, the user can switch an image file to be displayed, by pressing the L1 button 29a or R1 button 29b provided on the rear housing surface of the input device 20. If a certain image file is being decoded and displayed on the display device 12, the pressing of the L1 button 29a by the user allows a last image file to be decoded and displayed on the display device 12, while the pressing of the R1 button 29b by the user allows a subsequent image file to be decoded and displayed on the display device 12. As described, in the image processing device 10, the user's operation of the L1 button 29a generates an instruction for display in a reverse direction with respect to a sequence of image files for which a predetermined order is set, while the user's operation of the R1 button 29b generates an instruction for display in a forward direction with respect to the sequence of the image files. Hereinafter, an instruction for switching a display image is referred to as "display switching instruction."

When the input reception unit 102 receives a reproduction instruction while having the menu screen shown in FIG. 6, the display target determination unit 104 determines an image file to be displayed. The display target determination unit 104 determines an image file specified by the icon image 202 as an image file to be displayed, and the image data reading unit 106 reads out both the image file to be displayed and the attribute information thereof from the hard disk drive 50 and provides the image file and the attribute information to the reproduction processing unit 80. FIG. 5 shows that the image data reading unit 106 directly provides an image file, etc., to the reproduction processing unit 80. However, in reality, a configuration is employed where the image data reading unit 106 once stores, in the main memory 60, the image file and the like that have been read out from the hard disk drive 50 such that the reproduction processing unit 80 acquires the image file and the like that have been read out into the main memory 60.

In the sequence of the image files for which the display order is set, the position (order) of an image file to be displayed is set to be p, and the image file is expressed as I(p). Upon identification of I(p), the display target determination unit 104 notifies the image data reading unit 106 accordingly. Upon receipt of this notification, the image data reading unit 106 selects, as image files to be prefetched, the pth image file I(p) and a predetermined number of image files located before and after the image file I(p). For example, if the predetermined number is 2, the image data reading unit 106 reads out five image files I(p−2), I(p−1), I(p), I(p+1), and I(p+2) and provides the image files to the reproduction processing unit 80. The prefetching of the previous and subsequent image files is carried out in order to decode the previous and subsequent image files in advance such that an image can be displayed in real time in response to a display switching instruction, which will be provided later by the user.

The reproduction processing unit 80 has a function of acquiring an image file and decoding image data. The reproduction processing unit 80 performs an efficient decoding process according to the type of image data with use of the buffer memory 70.

FIG. 7A shows the configuration of the buffer memory 70. The buffer memory 70 comprises a display buffer 72 and a spare buffer 74. The display buffer 72 and the spare buffer 74 each have a capacity of 32 Mbytes. In the present embodiment, the display buffer 72 and the spare buffer 74 store image data decoded by the reproduction processing unit 80. The display buffer 72 stores image data obtained by decoding a single image file. The spare buffer 74 stores, in principle, image data obtained by decoding prefetched image data. The display buffer 72 and the spare buffer 74 may not have a storage capacity of the same size, and the storage capacity of the display buffer 72 may be larger.

In the image processing device 10 according to the present embodiment, when a display switching instruction is generated by the user's operation of the input device 20, the image display control unit 90 reads out image data that has already been decoded from the spare buffer 74 and displays the image data on the display device 12. When the reproduction processing unit 80 decodes image data to be displayed and stores the decoded image data in the display buffer 72, the image display control unit 90 reads out the image data from the display buffer 72 so that the image data is displayed on the display device 12.

In the reproduction processing unit 80, the decoding execution unit 84 decodes image data read out by the image data reading unit 106, and the reproduction control unit 82 controls a decoding process by the decoding execution unit 84. The reproduction control unit 82 performs a process of dividing each buffer in the buffer memory 70. More specifically, the reproduction control unit 82 divides a storage region of the spare buffer 74 by a predetermined division number and divides a storage region of the display buffer 72 by a division number corresponding to the type of the image data to be displayed. A division number is set to be at least the number of image data items included in an image file to be displayed. For example, in the case where a single image file includes a plurality of image data items as in the case of a multi-angle image file and a disparity image file, the reproduction control unit 82 stores the plurality of image data items decoded by the decoding execution unit 84 in the respective divided storage regions of the display buffer 72. The reproduction control unit 82 may identify the type of image data based on attribute information stored in the hard disk drive 50 or based on attribute information included in an image file. By setting the division number of the storage region of the display buffer 72 to be at least the number of image data items included in an image file to be displayed, the reproduction control unit 82 allows all decoding results of the image data items included in the image file to be stored in the display buffer 72. This allows the image display control unit 90 to display images included in a single image file on the display device 12 using only the display buffer 72.

In the present embodiment, the types of image data includes "multi-angle," "disparity," and "panorama," which are in an MP format, and "normal format" such as a JPEG or GIF in which a single image data item is compressed.

FIG. 7B illustrates an example of a usage state of the buffer memory 70. In the present embodiment, the storage region of the spare buffer 74 is divided by eight so as to create eight regions, each of 4 Mbytes. This division process is performed by the reproduction control unit 82. Therefore, the spare buffer 74 can store up to eight decoding results of image data items included in an image file. In the buffer memory 70, the division number of the spare buffer 74 is fixed to eight. However, a division number of the display buffer 72 is determined based on the type of an image file to be displayed as illustrated in the following. In the present embodiment, a division number represents the number of storage regions divided by a division process. In the case where the reproduction control unit 82 does not divide the display buffer 72, the division number is 1.

A division number of the display buffer 72 shown in FIG. 7B is 1. If the type of image data to be displayed is "panorama" or "normal format," the reproduction control unit 82 divides the region of the display buffer 72 by 1 (dividing by 1 means that there is no division occurring) and stores image data decoded by the decoding execution unit 84 in the display buffer 72.

The display target determination unit 104 determines the image data to be displayed and notifies the reproduction control unit 82. The reproduction control unit 82 then instructs the decoding execution unit 84 to decode image data for the spare buffer 74 if no image data that has been decoded is stored in the spare buffer 74. As described above, the size of a divided region of the spare buffer 74 is 4 Mbytes, thus allowing for prompt processing compared to the decoding of the image data for the display buffer 72 of 32 Mbytes. Therefore, the reproduction control unit 82 instructs the decoding execution unit 84 to decode the image data in a size that corresponds to that of the divided region of the spare buffer 74. When the image data to be displayed is decoded and stored in the divided region of the spare buffer 74, the image display control unit 90 reads out the image data and displays the image data on the display device 12. If image data that has been decoded is already stored in the spare buffer 74, the image display control unit 90 reads out the image data that has been decoded and displays the image data on the display device 12.

While displaying an image promptly on the display device 12 as described, the reproduction control unit 82 instructs the decoding execution unit 84 to decode image data in a size that corresponds to that of the divided region of the display buffer 72. In the example of FIG. 7B, the display buffer 72 is not divided (the division number is 1), and the size of the divided region is thus 32 Mbytes. Therefore, the decoding execution unit 84 decodes image data within a range of 32 Mbytes and stores the decoded image data in the display buffer 72. When the image data is stored in the display buffer 72, the reproduction control unit 82 issues an image data switching instruction to the image display control unit 90. Upon receipt of the switching instruction, the image display control unit 90 reads out the image data from the display buffer 72 and displays the image data on the display device 12. Image data to be stored in the spare buffer 74 may be obtained by reducing the number of pixels of image data to be stored in the display buffer 72. As described, in principle, image data with a small amount of data is stored in the spare buffer 74 for the purpose of display promptness, whereas image data with a large amount of data is stored in the display buffer 72 for the purpose of high-definition display. With this, an image can be promptly provided to the user, and a high-definition image can be provided to the user after decoded image data is stored in the display buffer 72.

Figure 8A:
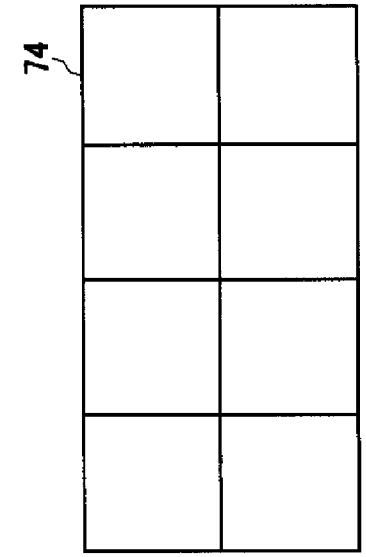
FIGS. 8A and 8B are diagrams illustrating an example of a usage state of the buffer memory.

FIG. 8A illustrates another example of a usage state of the buffer memory 70. As explained regarding FIG. 7B, the spare buffer 74 is still divided into eight regions. A division number of the display buffer 72 shown in FIG. 8A is 16. This division process is performed in the case where a "multi-angle" image file is to be displayed. In the following, it is assumed that image data prefetched by the image data reading unit 106 has already been decoded by the decoding execution unit 84 and stored in a divided region of the spare buffer 74 when the display target determination unit 104 determines image data to be displayed.

The prefetched image data of the multi-angle image file that is stored in the divided region of the spare buffer 74 is individual image data for which a representative image flag is set to 1. The reproduction control unit 82 identifies an individual image having a representative image flag of 1, which is included in an image file, and instructs the decoding execution unit 84 to decode the individual image. As described previously, up to 15 individual images are included in a multi-angle image file. In general, a representative image flag 1 is set for an image in the middle (the eighth image). The representative image flag 1 may be set for other image, and the setting of a representative image flag depends on the internal circuit of a digital camera. In either case, the reproduction control unit 82 identifies a representative image in a multi-angle image file and instructs the decoding execution unit 84 to decode the representative-image data in a data amount that falls within a divided region of the spare buffer 74. With this, the representative-image data of the multi-angle image file that has been decoded is stored in the spare buffer 74.

As described, the reproduction control unit 82 ensures that the representative-image data is decoded and stored in the spare buffer 74 before a plurality of individual image data items included in the multi-angle image are decoded and stored in the display buffer 72.

When the input reception unit 102 receives a display switching instruction and when the display target determination unit 104 determines image data to be displayed, the reproduction control unit 82 identifies that the type of the image data to be displayed is a multi-angle image and checks whether corresponding image data that has been decoded is stored in the spare buffer 74. If representative-image data that has been decoded is stored in the spare buffer 74, the reproduction control unit 82 instructs the image display control unit 90 to read out the representative-image data stored in the spare buffer 74 at this time. With this, the image display control unit 90 can display, on the display device 12, the representative image of the multi-angle image file.

The reproduction control unit 82 divides the storage region of the display buffer 72 by a division number of at least N, which is the number of images included in the multi-angle image file, at the same time. In the present embodiment, the maximum number of image data items that can be included in the multi-angle image file is 15. Thus, the reproduction control unit 82 divides the storage region of the display buffer 72 by a number of at least 15. In the example shown in FIG. 8A, the display buffer 72 is divided by 16 such that the size of a single divided region is 2 Mbytes. The reproduction control unit 82 may identify the number of image data items included in the multi-angle image file based on attribute information and divide the storage region of the display buffer 72 by the identified number. Minimizing the division number allows the data size of the display buffer 72 to be large.

Having divided the storage region of the display buffer 72, the reproduction control unit 82 instructs the decoding execution unit 84 to decode the plurality of image data items included in the multi-angle image file in a size that corresponds to that of the divided region of the display buffer 72. In the example of FIG. 8A, the size of the divided region of the display buffer 72 is 2 Mbytes. Therefore, the decoding execution unit 84 decodes the image data items included in the multi-angle image file within a range of 2 Mbytes and stores the decoded image data items in the respective divided regions. When all the image data items are decoded and stored in the respective divided regions of the display buffer 72, the reproduction control unit 82 issues an image data switching instruction to the image display control unit 90. Upon receipt of the switching instruction, the image display control unit 90 reads out the data of a representative image from the display buffer 72 and displays the data of the representative image on the display device 12. The user can enjoy a multi-angle image from now on.

While the image display control unit 90 displays on the display device 12 the representative-image data stored in the spare buffer 74, the decoding execution unit 84 can decode the plurality of image data items included in the multi-angle image file and store the decoded image data items in the divided regions of the display buffer 72. This allows the decoding execution unit 84 to decode the plurality of image data items during the display of the representative image. Thus, it is only necessary for the user to wait for a process of decoding the image file to finish while viewing the representative image. Upon completion of the decoding process by the decoding execution unit 84, a function of switching a multi-angle image is assigned to the left analog stick 27a. Tilting the analog stick 27a in a left or right direction, the user can interchangeably display a multi-angle image.

Figure 9:
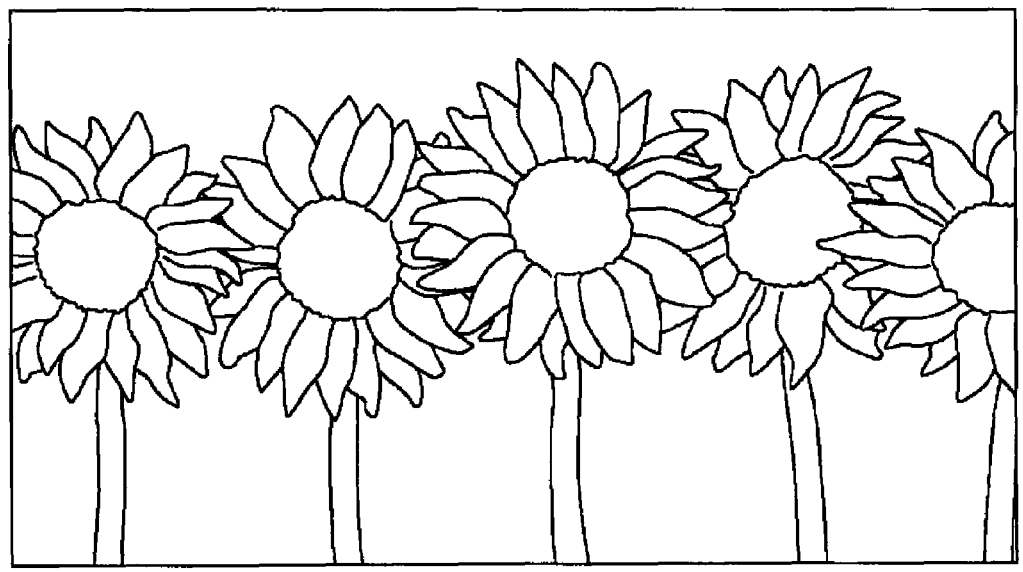
FIG. 9 is a diagram illustrating a representative image displayed on a display during decoding.

FIG. 9 illustrates a representative image displayed on a display during decoding of a multi-angle image file. This representative image is created by representative-image data stored in the spare buffer 74. Since the decoding of the multi-angle image file has not been completed, the input reception unit 102 does not accept any operation instruction even if the user operates the analog stick 27a at this time. The user waits for the decoding to be completed while viewing the representative image.

Figure 10:
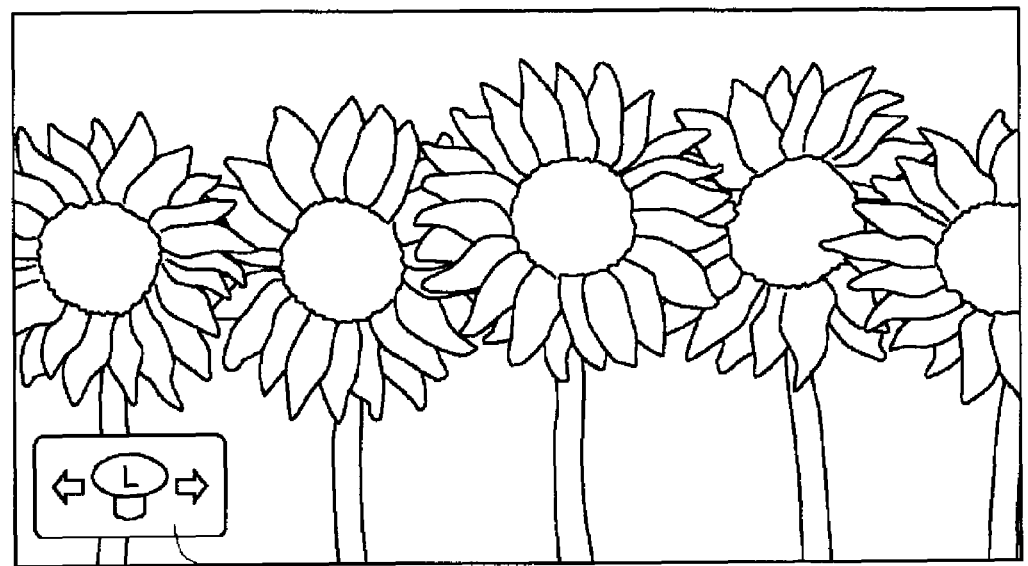
FIG. 10 is a diagram illustrating a representative image displayed on the display after the completion of the decoding.

FIG. 10 illustrates a representative image displayed on the display after the completion of the decoding of the multi-angle image file. This representative image is created by representative-image data stored in the display buffer 72. When the decoding execution unit 84 completes the decoding process of the multi-angle image file, the reproduction control unit 82 instructs the image display control unit 90 to display a predetermined indicator 210. The indicator 210 presents the user an operation method for switching a multi-angle image as well as presenting the user that the multi-angle image has become switchable. Viewing the indicator 210, the user can realize that the multi-angle image has become switchable.

During the display of the multi-angle image, the input reception unit 102 detects the amount of a tilt of the analog stick 27a and receives the amount of the tilt as a display switching instruction. Upon acquisition of the display switching instruction, the display target determination unit 104 identifies image data to be displayed and notifies the reproduction control unit 82 accordingly. The reproduction control unit 82 notifies the image display control unit 90 of information specifying the image data to be displayed, and the image display control unit 90 reads out the image data from a divided region of the display buffer 72 and displays the image data on the display device 12. All the image data items included in the multi-angle image file are decoded in the display buffer 72. Thus, the image display control unit 90 can switch the multi-angle image in real time.

The input reception unit 102 identifies a switching direction of an angle based on the direction of a tilt of the analog stick 27a and identifies switching speed of a display image based on the amount of a tilt (angle) of the analog stick 27a. As shown in the indicator 210, the analog stick 27a is pushed down in a left or right direction. An order is set for an individual image of the multi-angle image file, and operation of pushing down the analog stick 27a to the left creates an instruction for display in a reverse direction for a display image and operation of pushing down the analog stick 27a to the right creates an instruction for display in a forward direction for the display image. When the Mth individual image is being displayed, the instruction for display in a reverse direction instructs the display of an individual image earlier than the Mth individual image, and the instruction for display in a forward direction instructs the display of an individual image later than the Mth individual image.

The switching speed of the display image corresponds to the display time of an individual image, and high switching speed corresponds to short display time of the individual image. When the user tilts the analog stick 27 greatly, the switching speed of the display image becomes high, and the display time of the individual image therefore becomes shorter such that the individual image is switched in a short time. When the user brings back the analog stick 27a (when the analog stick is brought into an upright state), the switching of the display image stops. As described above, assigning the operation of switching a multi-angle image to the analog stick 27a allows for intuitive operation by the user.

Figure 8B:
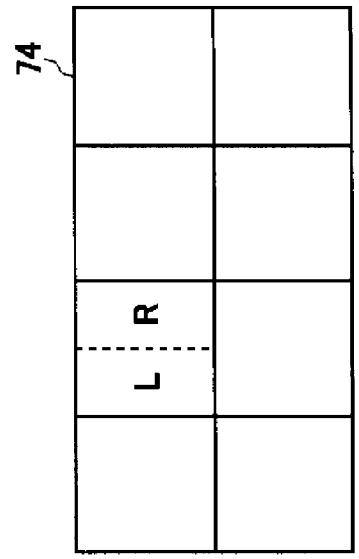
Figure 8B:
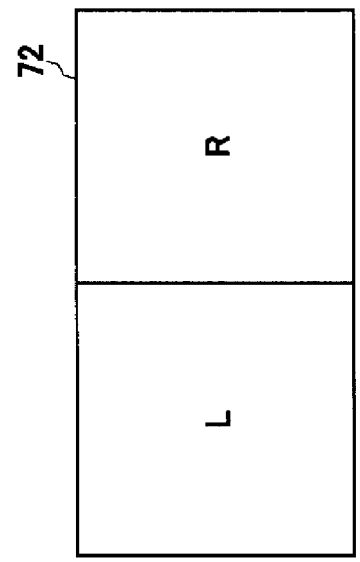

FIG. 8B illustrates another example of a usage state of the buffer memory 70. A division number of the display buffer 72 shown in FIG. 8B is 2. This division process is performed in the case where a "disparity" image file is to be displayed. As explained regarding FIG. 7B, the spare buffer 74 is still divided into eight regions. Left-eye image data and right-eye image data that are included in a prefetched disparity image file are stored in respective regions obtained by further dividing a divided region into two regions. In the following, it is assumed that the left-eye image data and the right-eye image data that are included in the prefetched disparity image file are decoded by the decoding execution unit 84 and then stored in the respective regions obtained by further dividing the divided region of the spare buffer 74 into two regions. In the spare buffer 74 of FIG. 8B, L represents left-eye image data, and R represents right-eye image data.

When the input reception unit 102 receives a display switching instruction and the display target determination unit 104 determines image data to be displayed, the reproduction control unit 82 identifies that the type of the image data to be displayed is a disparity image and checks whether corresponding image data that has been decoded is stored in the spare buffer 74. If left-eye image data and right-eye image data that have been decoded are stored in the spare buffer 74, the reproduction control unit 82 instructs the image display control unit 90 to read out the respective image data items stored in the spare buffer 74 at this time. With this, the image display control unit 90 displays, on the display device 12, a left-eye image and a right-eye image of the disparity image file.

The reproduction control unit 82 divides the storage region of the display buffer 72 into two regions. Since the number of image data items included in the disparity image file is two, the reproduction control unit 82 divides the storage region of the display buffer 72 into two regions. With this, the size of a single divided region becomes 16 Mbytes.

Having divided the storage region of the display buffer 72, the reproduction control unit 82 instructs the decoding execution unit 84 to decode the two image data items included in the disparity image file in a size that corresponds to that of the divided region of the display buffer 72. In the example of FIG. 8B, the size of the divided region of the display buffer 72 is 16 Mbytes. Therefore, the decoding execution unit 84 decodes the left-eye image data and the right-eye image data within a range of 16 Mbytes and stores the decoded image data items in the respective divided regions. When the both image data items are decoded and stored in the respective divided regions of the display buffer 72, the reproduction control unit 82 issues an image data switching instruction to the image display control unit 90. Upon receipt of the switching instruction, the image display control unit 90 reads out the left-eye data image data and the right-eye image data from the display buffer 72 and displays the image data items on the display device 12 in a three-dimensional manner. With this, the user can enjoy a disparity image.

Figure 11:
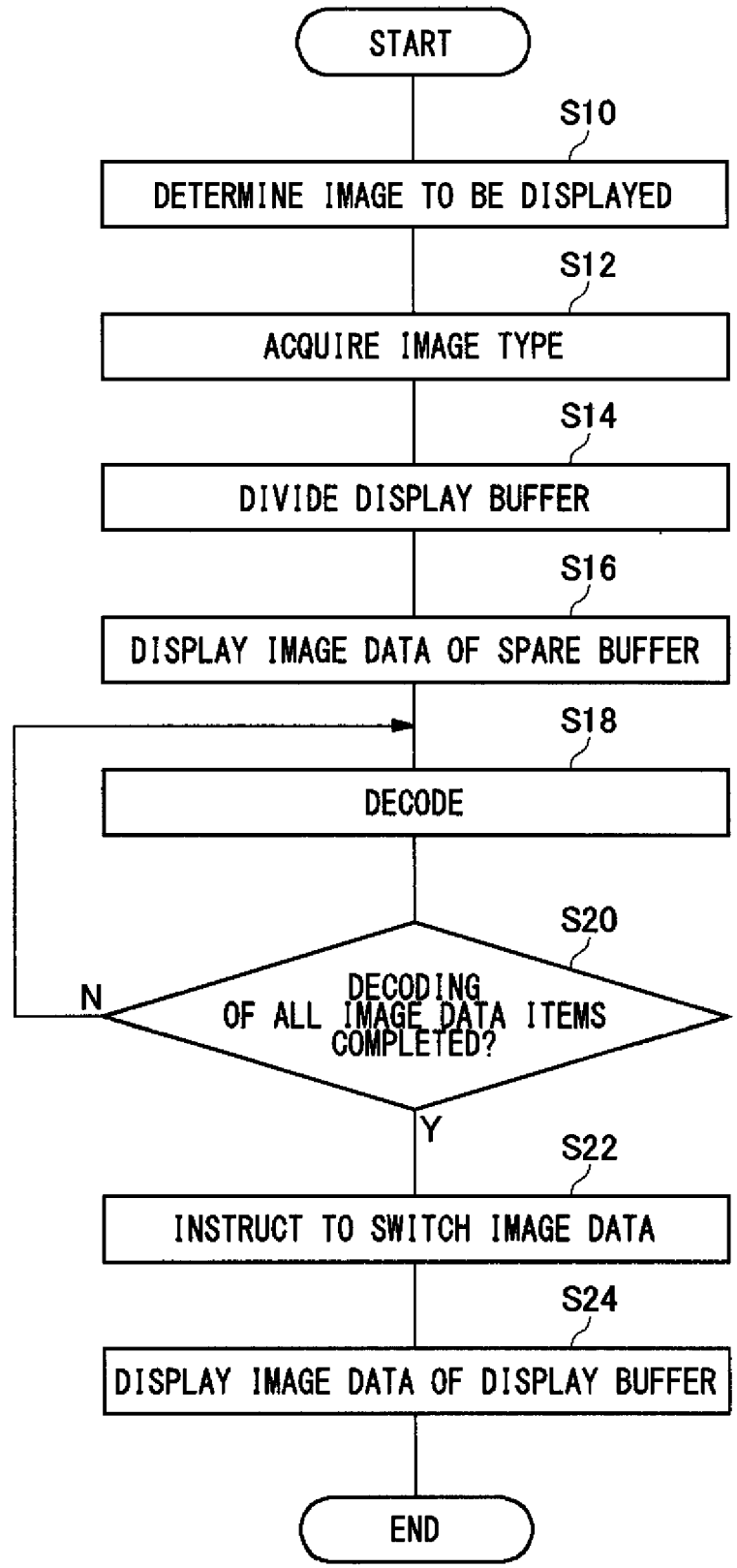
FIG. 11 is a diagram illustrating a flowchart of an image reproduction process.

FIG. 11 illustrating a flowchart of an image reproduction process by an image viewer. This flow is performed every time an image file is determined to be displayed. In the flow, it is assumed that prefetched image data has already been decoded and stored in the spare buffer 74.

The display target determination unit 104 determines an image file to be displayed (S10). The reproduction control unit 82 acquires the type of the image file to be displayed (S12) and divides the storage region of the display buffer 72 in accordance with the type (S14). The reproduction control unit 82 checks whether corresponding image data is stored in the spare buffer 74, and if the corresponding image data is stored, the image display control unit 90 displays the image data in the spare buffer 74 on the display device 12 (S16). The order of S14 and S16 may be reversed.

While the image display control unit 90 displays the image data in the spare buffer 74 on the display device 12, the decoding execution unit 84 decodes the image data included in the image file to be displayed (S18). In the case where a plurality of image data items are included, the decoding process is performed until the decoding of all the image data items is completed (N in S20). When all the image data items have been decoded and stored in the respective divided regions of the display buffer 72 (Y in S20), the reproduction control unit 82 issues an instruction for switching image data to be used (S22), and the image display control unit 90 displays on the display device 12 the image data in the display buffer 72 (S24).

Described above is an explanation based on the exemplary embodiments of the present invention. These exemplary embodiments are intended to be illustrative only, and it will be obvious to those skilled in the art that various modifications to constituting elements and processes could be developed and that such modifications are also within the scope of the present invention.

What is claimed is:

1. An image processing device comprising:
  a reproduction processing unit configured to decode image data;
  a display buffer configured to store the decoded image data; and
  an image display control unit configured to display the image data stored in the display buffer,
  wherein the reproduction processing unit divides the display buffer into a variable number of divided regions according to the type of the image data to be displayed and stores the decoded image data in at least one of the divided regions.

2. The image processing device according to claim 1, wherein, when the type of the image data to be displayed is a multi-angle image, the reproduction processing unit divides the region of the display buffer into at least N regions, N being the number of images included in the multi-angle image, and stores the decoded image data in each divided region.

3. The image processing device according to claim 2, further comprising:
  a spare buffer configured to store the decoded image data,
  wherein the reproduction processing unit decodes, before decoding a plurality of image data items included in the multi-angle image and storing the decoded image data items in respective divided regions of the display buffer, representative-image data included in the multi-angle image and stores the decoded representative-image data in the spare buffer, and
  wherein the image display control unit displays the representative image data stored in the spare buffer.

4. The image processing device according to claim 3, wherein, while the image display control unit displays on a display the representative-image data stored in the spare buffer, the reproduction processing unit decodes the plurality of image data items included in the multi-angle image and stores the decoded image data items in the divided regions of the display buffer.

5. The image processing device according to claim 4, wherein, upon completion of a process of decoding the plurality of image data items by the reproduction processing unit, the image display control unit displays a predetermined indicator on the display.

6. The image processing device according to claim 1, wherein, when the type of the image data to be displayed is a disparity image, the reproduction processing unit divides the region of the display buffer by two and stores left-eye image data and right-eye image data in respective divided regions.

7. A non-transitory computer-readable recording medium containing a computer program, the computer program comprising:
  a module configured to determine image data to be displayed;
  a module configured to identify the type of the image data to be displayed;
  a module configured to divide the region of a display buffer into a variable number of divided regions according to the identified type; and
  a module configured to decode the image data and to store the decoded image data in at least one of the divided regions.

8. An apparatus having a processor and a computer-readable recording medium containing a computer program, which when executed by the process causes the apparatus to perform actions, comprising:
   decoding image data;
   storing the decoded image data in a display buffer; and
   displaying the image data stored in the display buffer,
   wherein the reproduction processing unit divides the display buffer into a variable number of divided regions according to the type of the image data to be displayed and stores the decoded image data in at least one of the divided regions.

* * * * *